J. P. TARBOX.
BALANCING MECHANISM.
APPLICATION FILED NOV. 14, 1911.
1,180,275.
Patented Apr. 18, 1916.
9 SHEETS—SHEET 4.
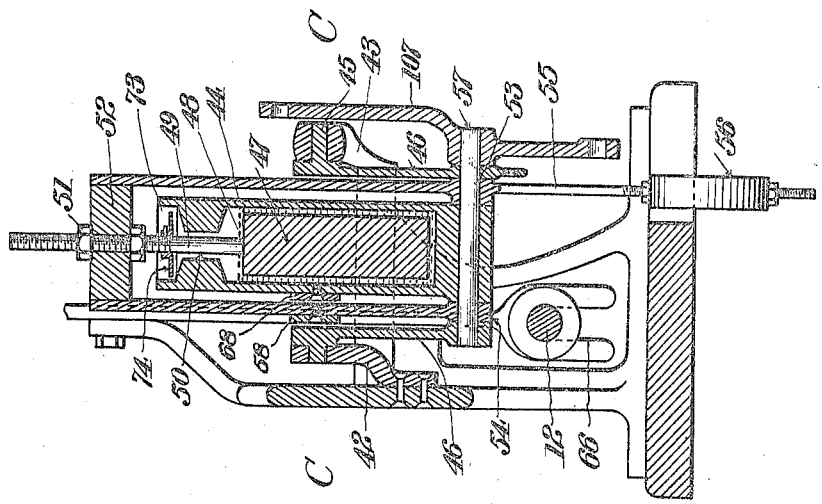
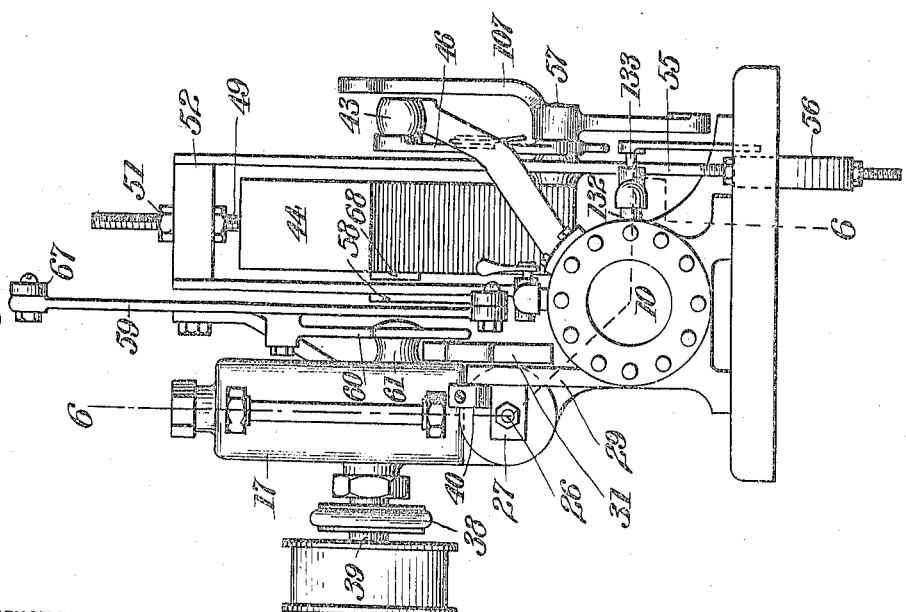
WITNESSES
INVENTOR J. P. TARBOX.
BALANCING MECHANISM.
APPLICATION FILED NOV. 14, 1911.
1,180,275.
Patented Apr. 18, 1916.
9 SHEETS—SHEET 5.
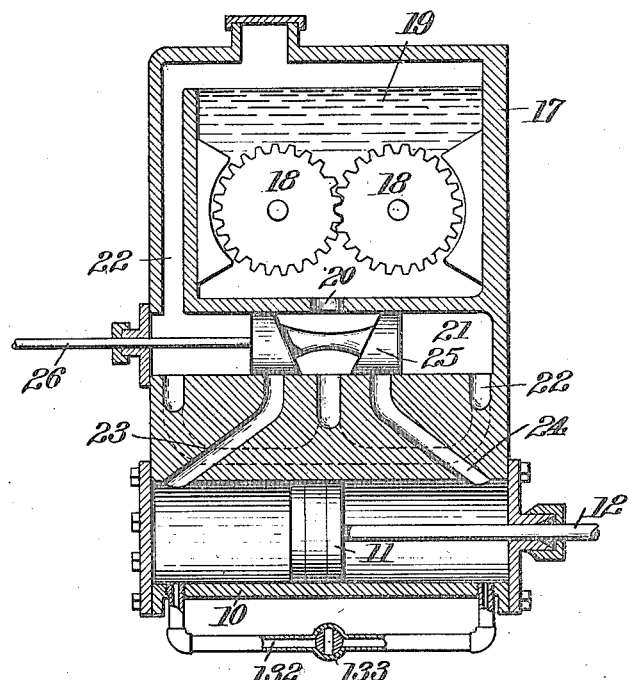
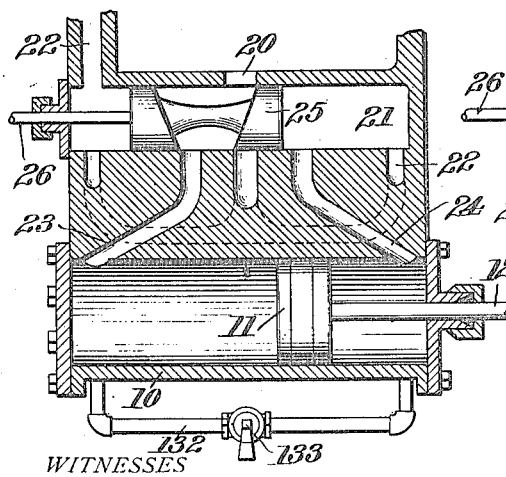
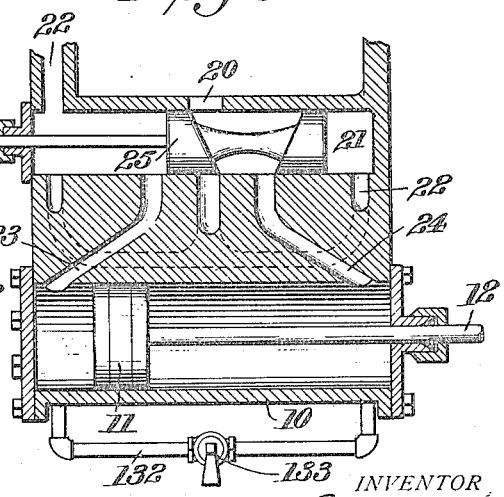

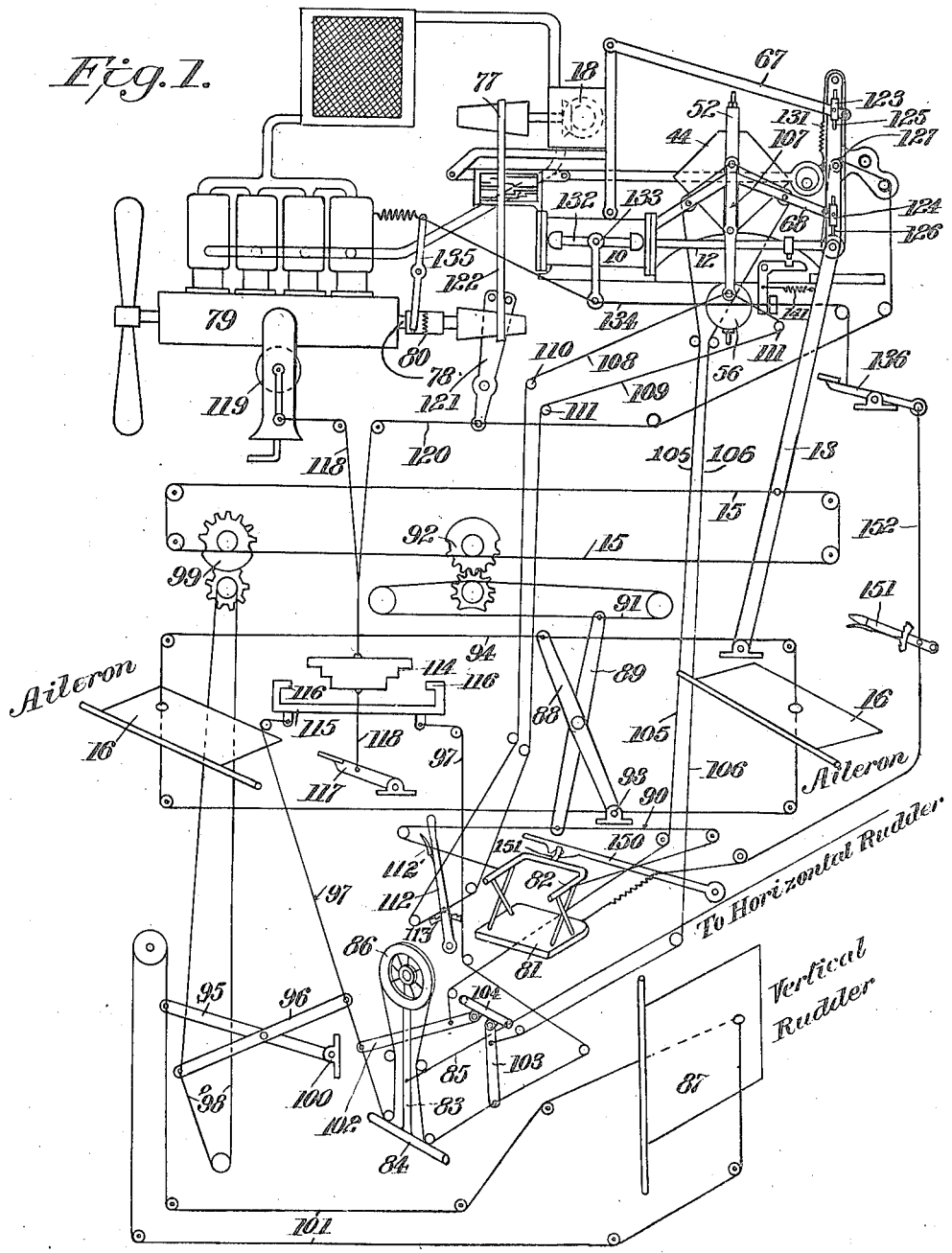

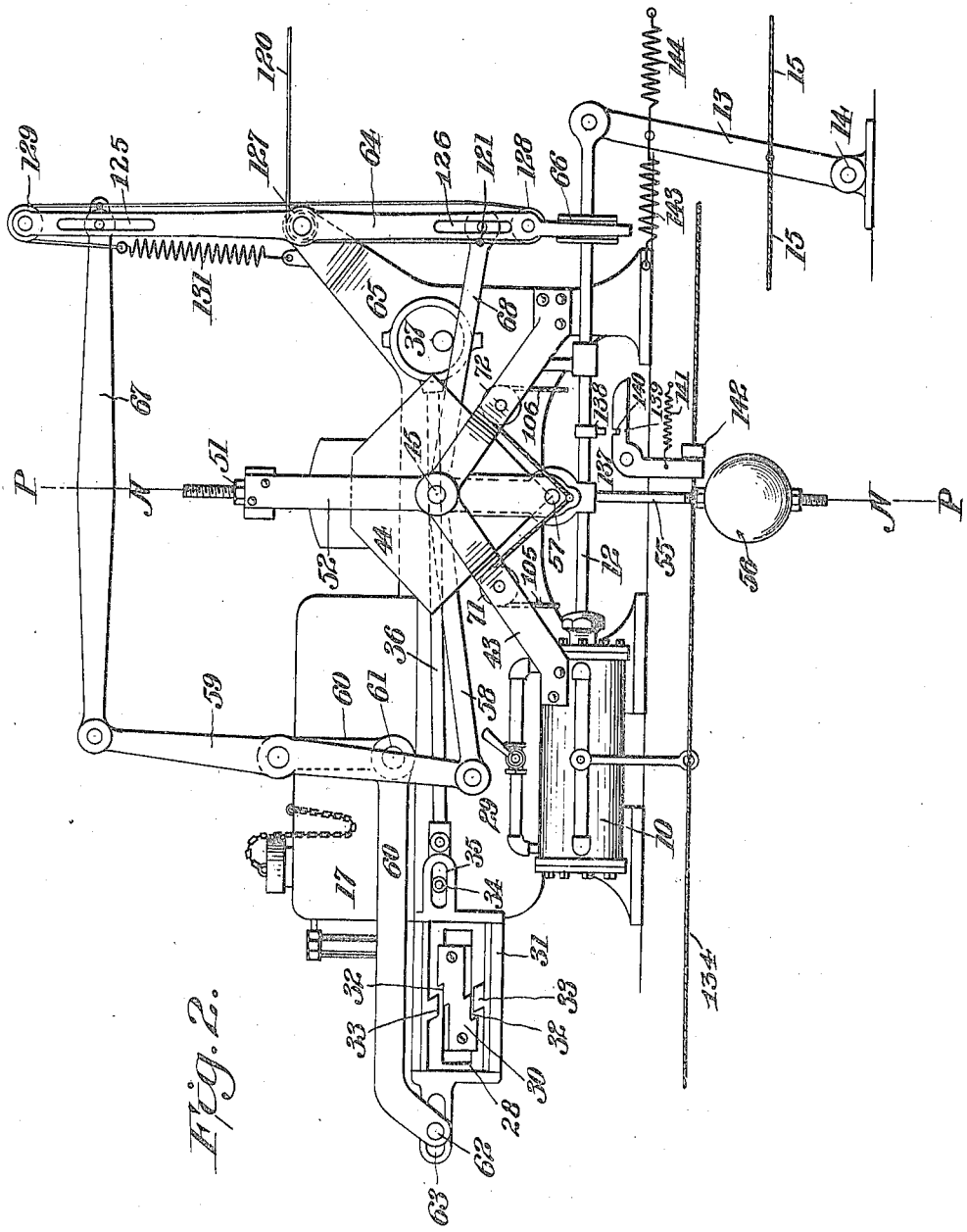

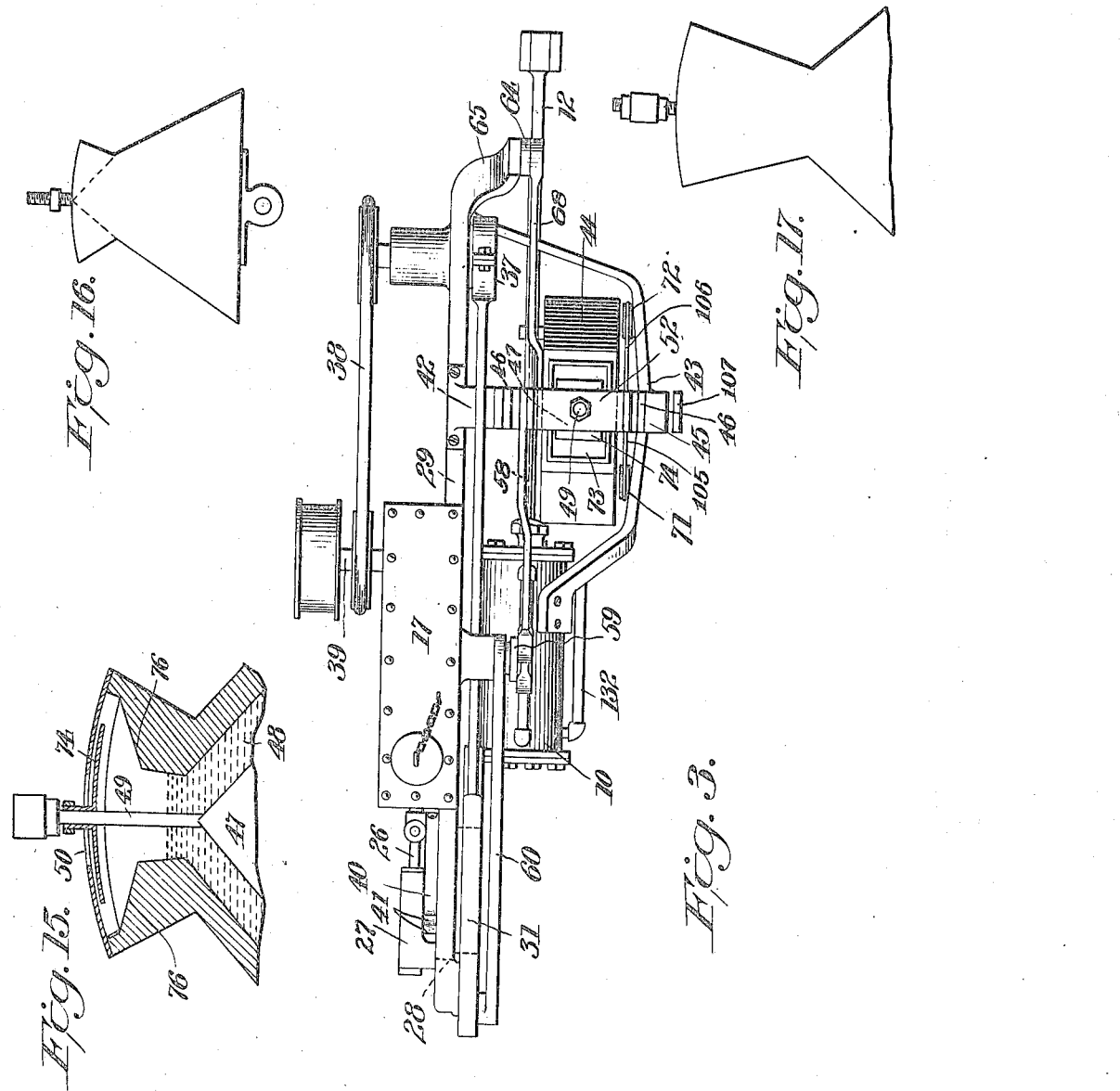

J. P. TARBOX.
BALANCING MECHANISM.
APPLICATION FILED NOV. 14, 1911.
1,180,275.
Patented Apr. 18, 1916.
9 SHEETS—SHEET 6.
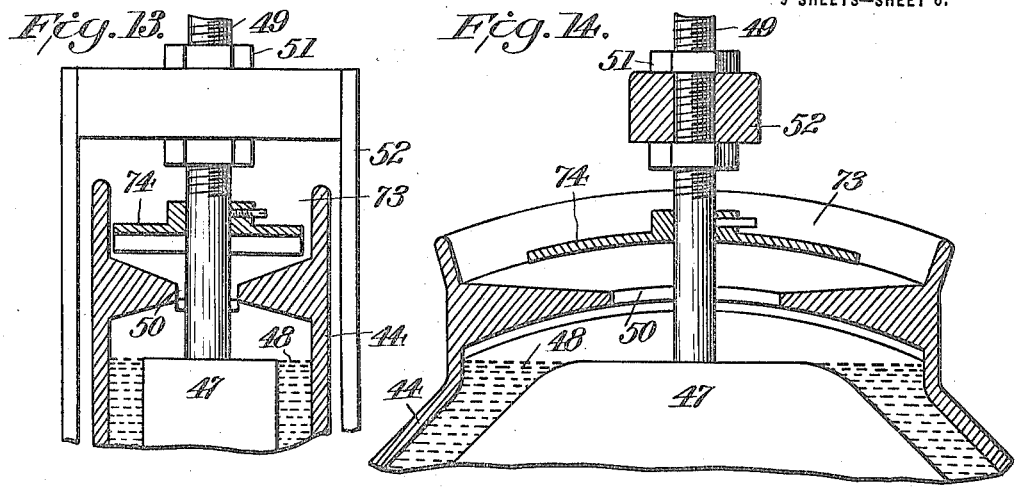
Fig. 13.  Fig. 14.
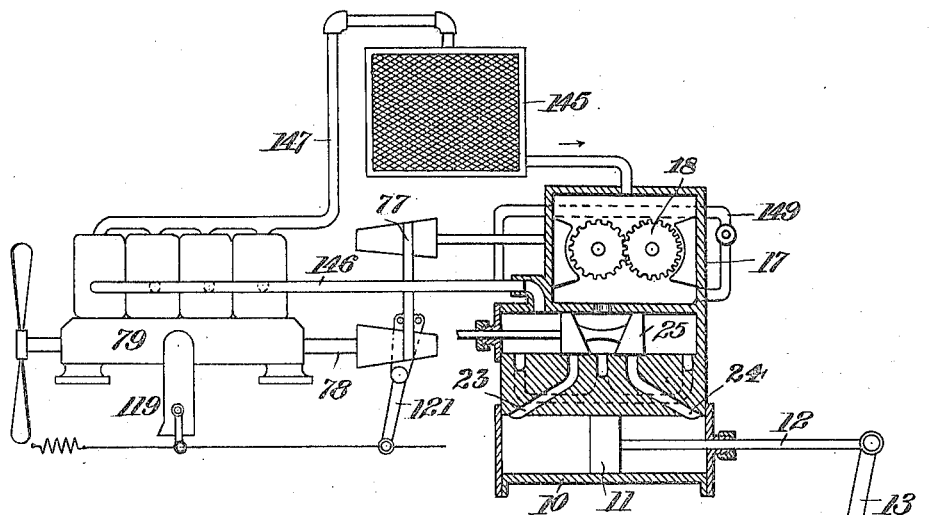
Fig. 9.
WITNESSES
INVENTOR

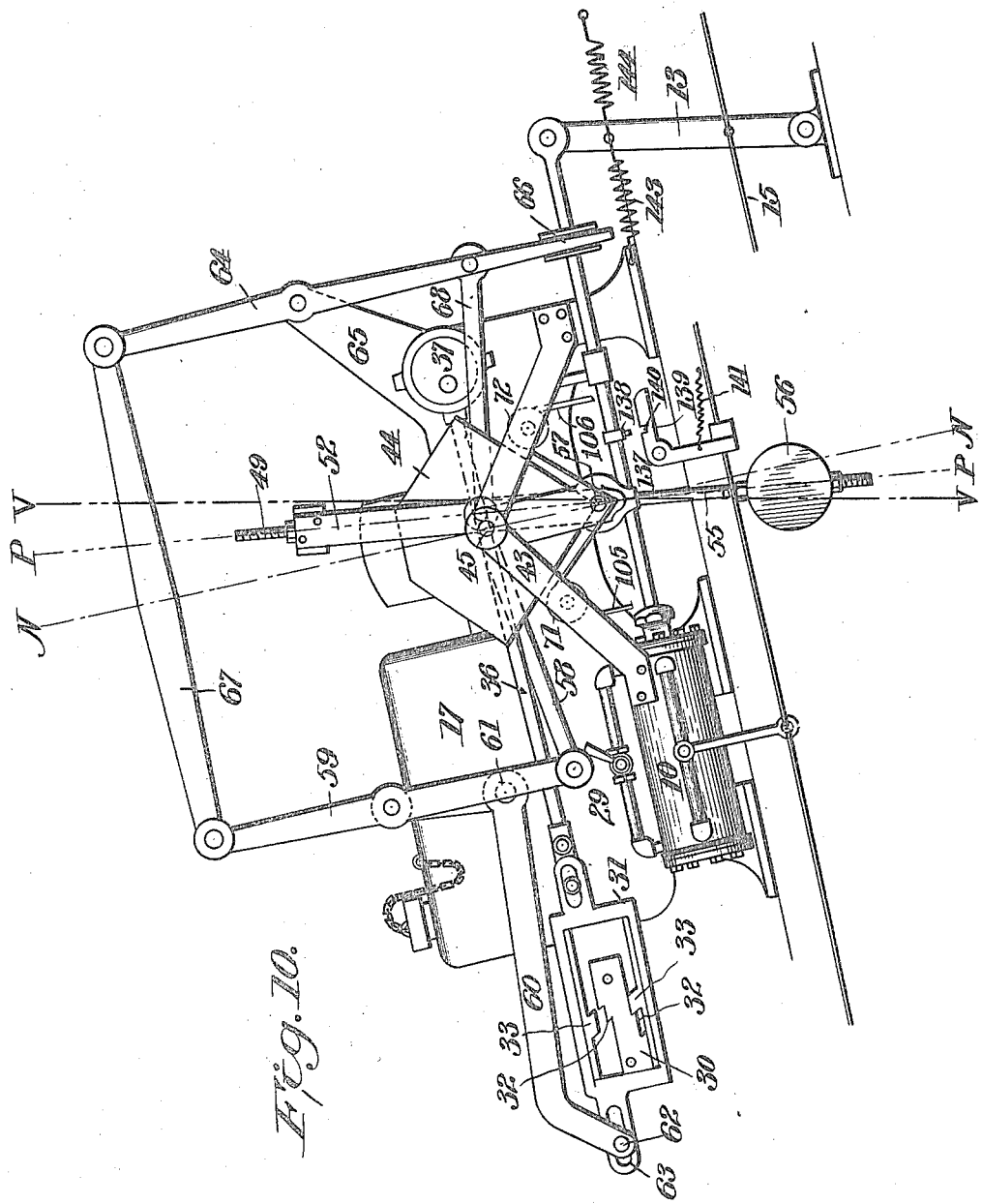

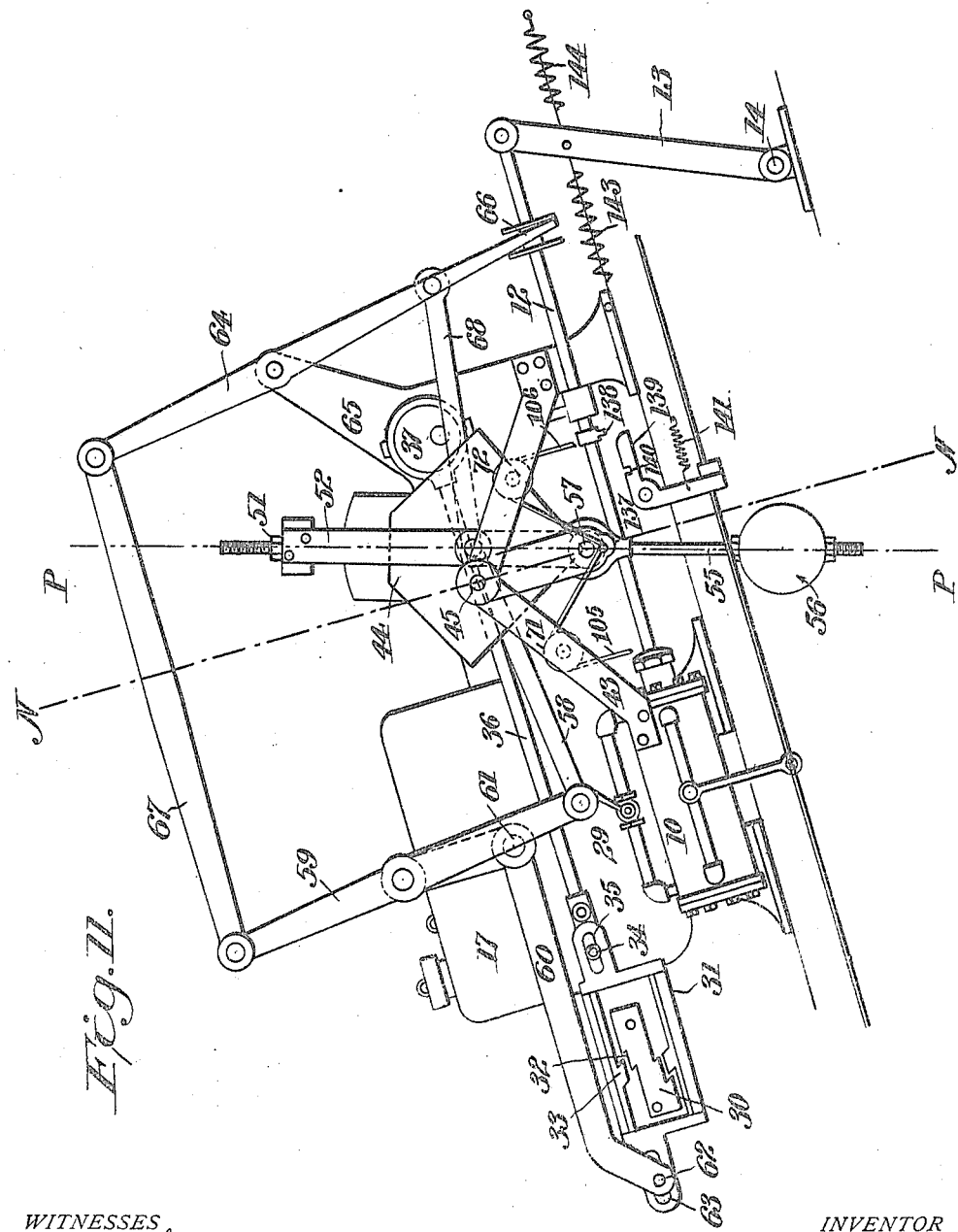

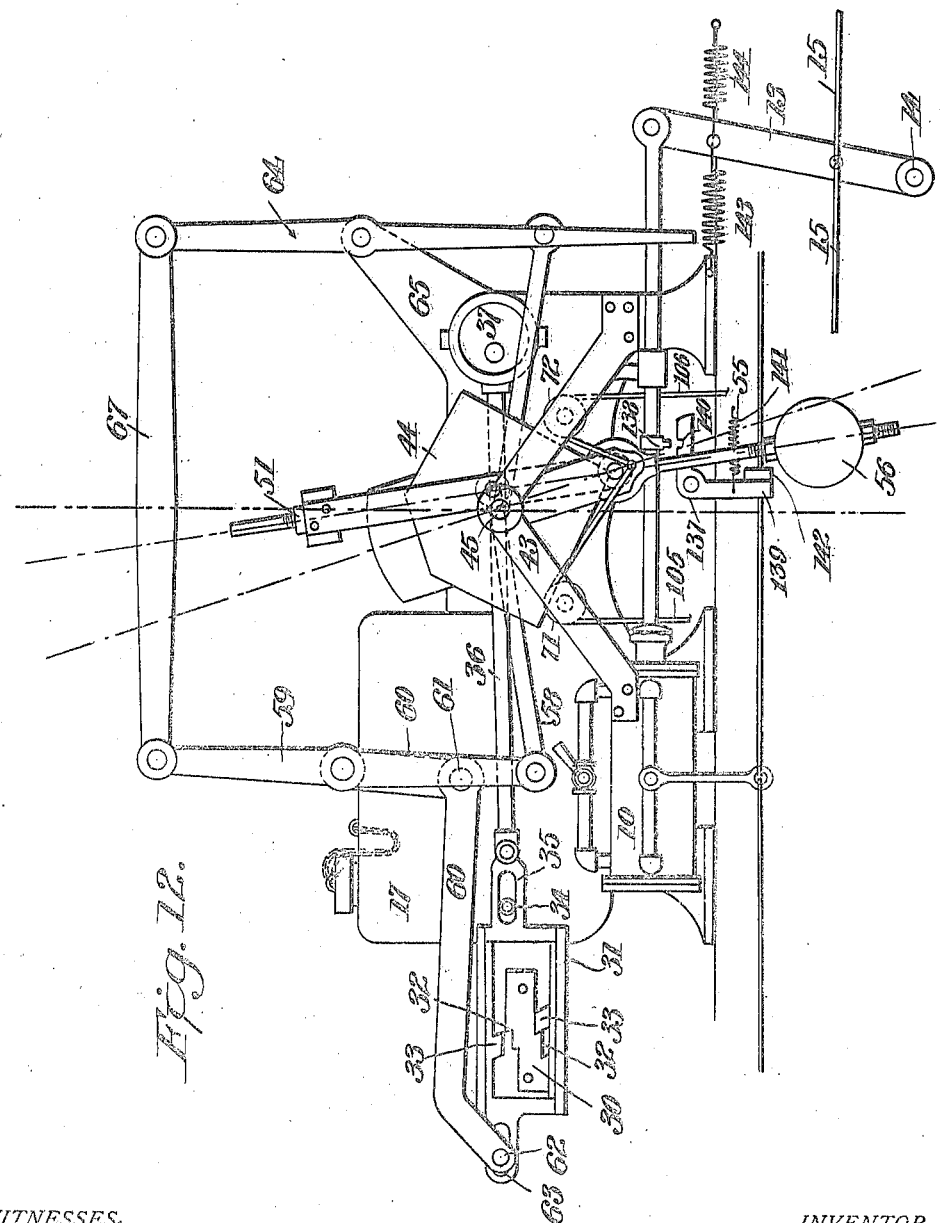

UNITED STATES PATENT OFFICE.

JOHN P. TARBOX, OF WASHINGTON, DISTRICT OF COLUMBIA, ASSIGNOR TO TARBOX SAFETY AIRCRAFT COMPANY, A CORPORATION OF DELAWARE.

BALANCING MECHANISM.

1,180,275.   Specification of Letters Patent.   Patented Apr. 18, 1916.

Application filed November 14, 1911. Serial No. 660,249.

*To all whom it may concern:*

Be it known that I, JOHN P. TARBOX, a citizen of the United States, residing at Washington, District of Columbia, have invented certain new and useful Improvements in Balancing Mechanisms, of which the following is a specification.

My invention relates to an automatic balancing mechanism for air craft, the mechanism being of the type known as hydraulic. While of the particular relation mentioned, however, it will be evident upon an understanding of my invention that it may be embodied in balancing mechanisms of many other types, such for instance as those operated mechanically through gears, by compressed air, by electricity or other agents.

As shown in the accompanying drawings one embodiment of my invention is in a mechanism of the hydraulic type.

Of the drawings—Figure 1 is a general diagrammatic view of the mechanism and the accompanying connections to the balancing and steering devices of an air-craft. Fig. 2 is a front elevation of the mechanism *per se;* Fig. 3 is a plan view of the same; Fig. 4 is a left hand end view; Fig. 5 is a central transverse section on line P—P of Fig. 2; Fig. 6 is a longitudinal section of the pump, valve and piston of the device, taken on line 6—6 of Fig. 4; Figs. 7 and 8 are diagrammatic views of the valve in its several positions; Fig. 9 is an enlarged sectional view of a portion of Fig. 1, showing the connection of the mechanism to a driving motor; Fig. 10 is a view of the mechanism showing the position of its parts immediately a list to the left takes place and before the mechanism has operated to change the position of the balancing devices; Fig. 11 is a similar view showing the positions of the parts after this operation of the balancing devices has taken place and before the unbalancing of the craft has been entirely corrected; Fig. 12 is a view of the mechanism showing the position of the parts immediately upon the movement of the controls of the air-craft to make a turn, and before the balancing devices have been operated to bank the craft; Figs. 13 and 14 are transverse and longitudinal sections of the upper portion of the pendulum tank; Figs. 15, 16, and 17 are views of modified forms of the tank.

The mechanism comprises an operating means for balancing devices, a power transmitting means, a power shifting device through which the transmission of power to said operating means may be controlled, a a standard of position controlling the power shifting device, a follow-up device between the operating means and the power shifting device by which the degree of movement of the operating means is controlled, connections and regulating devices between the devices already named whereby an accurate and freely controlled movement of the balancing devices is had with the requisite rapidity, and the associated system of connections between the steering devices of the air-craft, their controls, and the driving motor of the air-craft and its controls.

The invention has for its aims increased accuracy, efficiency, reliability, safety and rapidity of action.

Referring to the drawings, the mechanism *per se* will first be described in detail as to this embodiment, and thereafter the mechanism will be described in its relation to the associated system of connections, etc.

The operating means for the balancing devices comprises a cylinder 10 (Fig. 2) containing a piston 11 acting through piston rod 12 upon a lever 13 pivoted at its lower end 14 to a fixed point and connected by cables 15 indirectly to the balancing devices 16 (Fig. 1). The piston 11 has a normal central position as shown in Fig. 6, and is adapted to be moved by fluid pressure toward one end or the other of its cylinder 10, thus moving the balancing devices 16 one way or the other through the intermediate connections.

The power transmitting device comprises a container 17 in which there is located a gear pump 18 (Fig. 6). This tank contains fluid 19 and the pump 18 is adapted to propel the fluid from the top to the bottom of the tank and out through by-pass port 20, through valve chamber 21 and bypass 22 to the top of the tank. The pump is rotated continuously from any suitable source of power, the flow of fluid therefore being continuous. Ports 23 and 24 open from the valve chamber 21 on opposite sides of by-pass 22 and into the opposite ends of the cylinder 10.

The power shifting device comprises a double ended piston valve 25 located in the valve chamber 21 and adapted to control the flow of fluid through the several ports mentioned, and means for shifting the valve. Referring to Figs. 6, 7 and 8, it will be seen that the disks of the valve 25 are formed with their inner adjacent sides tapering upwardly, and that the lower portions of the faces of the disks are of sufficient width to normally cover both ports 23 and 24 when the valve is in its central position as shown, the by-pass 22 lying between the ports and being normally uncovered. Preferably, the edges of the valve 25 divide the distance between the adjacent edges of port 22 and ports 23 and 24 about in half as clearly shown in Fig. 6.

When the valve 25 is moved toward the left as shown in Fig. 7, the by-pass 22 is closed from communication with port 20, and fluid passes through port 23 into the left-hand end of the cylinder 10, the fluid in the right-hand end of the cylinder being driven out through port 24 into the valve chamber 21 and through the by-pass 22, which it will be seen opens into the opposite ends of the chamber 21, and back to the top of the tank 17. As the opposite ends of the chamber 21 are connected together by the by-pass 22, it will be seen that the valve 25 is a balanced valve. When the valve is moved to the right, as shown in Fig. 8, the reverse of the action described takes place, fluid being forced into the right-hand end of the cylinder through port 24, and the fluid in the left-hand end of the cylinder passing by way of port 23 and by-pass 22 back to the tank.

The valve stem 26 passes out of the valve chamber 21 and is connected to a block 27 adapted to reciprocate in a slot 28 in the frame 29 of the mechanism. The front side of this block 27 carries a relay block 30 adapted to be engaged by a relay frame 31 whereby the valve 25 may be reciprocated. The block 30 is provided with upper and lower sets of teeth 32 oppositely disposed and spaced apart and adapted to be engaged by the teeth 33 on the inside of the frame 31. The frame 31 is pivoted by a pin and slot connection 34—35 to the frame 29, and is constantly reciprocated by eccentric rod 36 connected to it at one end and to eccentric 37 at the other, the eccentric 37 being continuously rotated by means of a belt connection 38 with driving shaft 39 of the pump 18 (Fig. 3). As explained in my co-pending application Serial No. 641,662, when the relay frame 31 is moved up, the valve 25 is moved to the left, when the frame 31 is moved back to a central position, while when the frame 31 is moved downwardly, the valve is moved to the right, the teeth on the block 30 and the frame 31 being so spaced and proportioned as to accomplish this result. A leaf spring 40 (Fig. 3) one end of which is fixed to the side of tank 17, the other end of which bears always in one of three notches 41 in the block 27 (Fig. 3) holds the block 27 and the valve 25 in any position to which they are moved.

The standard of position comprises a float pendulum supported by brackets 42 and 43 from the frame 29 (Fig. 5).

44 is a tank rectangular in shape which is supported from its lower corner (one of the diagonals of the tank being vertical) by means of a U-shaped hanger 46 on which its lower end is pivoted at 57, the hanger 46 being in turn pivoted in the brackets 42—43, the line of centers C—C of the pivots being a common one. 47 is the float within the tank, and this float is also rectangular in shape, though both the tank and float may be made of any other suitable shape. The float 47 is carried substantially submerged in liquid 48 by means of rod 49 projecting upwardly through the mouth slot 50 of the tank and adjustably secured at its upper end 51 to the yoke 52 which at its lower ends is pivoted at 53 and 54 to the hanger 46, the yoke 52 straddling the tank 44. Depending from the right-hand arm of yoke 52 is a rod 55 carrying at its lower end a weight 56 which acts as a counterweight for the float 47 and the yoke 52 above their pivot 57. Preferably the mass of the weight 56 is made such that when multiplied by the distance from its center of gravity to the pivot 57 (the mass of the rod 55 being also included) that the product equals the product of the mass of the yoke 52 and attached float 47 multiplied by the distance of the center of gravity of these masses above the pivot 57. When constructed in this manner, the effects of centrifugal force and other forces acting uniformly on the standard of position are eliminated, and gravity acting through the liquid 48 is free to maintain the standard of position accurately in its normal vertical position.

The yoke 52 of the standard of position is connected to the relay frame 31 in such a manner that when the float is moved in response to an unbalancing of the craft to which the mechanism is applied, the relay frame 31 is moved in a direction to cause such a shifting of the valve 25 through the block 30 as will cause a movement of the piston 11 in the cylinder 10 sufficient to give the balancing devices the requisite degree of movement to correct the unbalancing of the craft. This connection comprises a link 58 connected with the left-hand arm of the yoke 52 at one end, and at the other with the lower end of a differential lever element 59 which in turn is pivoted at its middle to the upper end of bell crank lever 60, which lever is pivoted at 61 to the frame 29 and connects at its other end by pin and slot connection 62—63 with the relay frame 31. Thus if the upper end of the differential lever element 59 is maintained stationary during movement of the float 47 of the standard of position, a movement of the frame 31 up or down is accomplished when the float 47 moves to right or left in response to list of the air-craft. The upper end of the differential element 59 is held normally stationary by the follow-up device.

The follow-up device comprises a lever 64 pivoted at its middle to arm 65 of frame 29, connected at its lower end by slot connection 66 with piston rod 12, and at its upper end to link 67 connecting with the upper end of the lever element 59. This follow-up device also connects by means of lever 68 with the tank 44. It is to be noted that the points of connection of the levers 58 and 68 to the yoke 52 and the float tank 44 respectively lie on the common line of centers C—C. Thus when the tank 44 is moved about the line of centers C—C, as it may be by rocking the hanger 46 about its pivots, there is no disturbance or alteration of the positions of the levers 58 and 68. By means of cords 105 and 106 passing over pulleys 71 and 72 on bracket 43 and connecting to the lower end 45 of hanger 46, this shifting of the tank 44 together with the entire standard of position of which it is a part may be effected. By means of this shifting, the angular position of the standard of position with respect to the remaining portion of the mechanism and with respect to the air-craft on which it is fixed, may be altered at will, thereby changing the angle of balance of the craft.

The tank 44 is what is called a closed tank, the opening in its top being very small as compared with its greatest cross section. The mouth of the tank is recessed at 73 surrounding the slot 50, and a cover 74 free of the walls of the tank is carried by the rod 49, and is of sufficient length to cover the slot 50 at all times, thereby preventing the splashing of liquid from the tank. In Fig. 15 I show a modification of this tank 44 in which the slot 50 is formed in the extreme top of the tank, and the plate 74 constituting the cover is carried by the rod 49 below the top 75 and the slot 50, thus liquid is entirely prevented from being thrown out of the slot. Inner lips or walls 76 slant downwardly from the opposite sides of the float rod 49, so that such mercury as is projected against the cover plate 74 readily finds its way back to the main body of liquid 48. In addition these lips 76 serve the purpose of preventing displacement of the liquid 48 to the top of the tank when the tilting of the tank is less than 45°. It is because the tank is polygonal in shape, and because these lips 76 are used, that this tilting of the tank without appreciable surface displacement of the liquid is possible. By using a triangular tank as shown in Fig. 16, this angle may be increased from 45° to 60°. Also, by using a tank having a long neck as shown in Fig. 17, this angle may be still further increased.

This mechanism may be driven from any desired continuously operating source of power. Instead of connecting to an auxiliary motor, it is in this embodiment connected to the driving motor of the air-craft. Referring to Fig. 1 the pump 18 is connected by speed changing device 77 to the main shaft 78 of driving motor 79 through a clutch 80. Thus the mechanism may be driven continuously, and the balancing devices 16 may be moved through the connections 13 and 15 previously referred to to correct unbalancing.

The balancing devices shown are of the Curtiss type as is also the group controls. These controls comprise a chair 81 having movable shoulder forks 82 through which the balancing devices 16 may be moved by movement of the body of the person seated in the chair, and a vertical steering post 83 pivoted on a transverse axis 84 and connected by means of cable 85 to the horizontal rudder of the air-craft, the said steering post 83 carrying at its upper end a steering wheel 86 by the turning of which the vertical rudder 87 may be moved manually from one position to another.

The connection of the shoulder forks 82 and the balancing mechanism described is made through differential levers 88 and 89, connection being made to one end of lever 89 by means of cables 90 connected to the parts 82 and to the other end of lever 89 by means of cables 91 adapted to be driven from cable 15 connecting with lever 13 of the mechanism by means of the Geneva gear 92. One end of lever 88 is connected to a fixed part 93, while the other end is connected to cables 94 connecting directly with the balancing devices 16. Thus when lever 89 is moved either by means of the shoulder forks 82 or by means of the mechanism through lever 13, the balancing devices are moved by virtue of the movement of lever 88 about its pivot 93. The Geneva gear 92 it is to be noted is so made that the balancing devices 16 may be moved to a certain position in either direction, and thereafter becomes locked in that position even though movement of lever 13 continues. Connection to the vertical rudder 87 from the steering wheel 86 is also made through differential levers, these levers being shown at 95 and 96 as similar to levers 88 and 89. Cable 97 passing over wheel 86 connects with one end of lever 96. The opposite end of lever 96 is connected to cable 98 adapted to be moved by the Geneva gear 99, one element of which is connected with the cable 16 operated by the mechanism through lever 13. One end of lever 95 is connected with fixed part 100, while the opposite end connects by cable 101 to the vertical rudder 87. Thus the vertical rudder may be readily moved by hand. The gear 99 is normally in locked position, but after a predetermined movement of the balancing devices 16 through lever 13 in either direction, the vertical rudder 87 is moved in a direction to assist the balancing devices 16 in correcting the unbalancing of the craft. Preferably the position in which the balancing devices 16 are locked by the gear 92 is their position of maximum effectiveness. The cables 90, 91, 94, 97, 98 and 101 are of course laterally flexible, to coöperate with the respective levers to which they connect. Also connected with cables 97 extending to the vertical rudder control 86 are a pair of levers 102—103 pivoted at their inner ends to fixed part 104. Extending from intermediate points upon these levers 102—103 are cables 105—106 which connect with lever 107 (Figs. 1, 4 and 5) which lever is omitted from Fig. 2 and others similar for the sake of clearness, the cords 105—106 being shown connected directly to pivot 57. The lever 107 is connected at an intermediate point to the pivot 57 of the tank 44. Its lower end is connected to cables 108—109 passing over pulleys 110—111 and connecting with a hand lever 112 provided with a locking means 113 and located beside the seat 81. Thus the position of the standard may be changed by hand as well as through movement of the vertical rudder control wheel 86.

A limit to the movement of the vertical rudder 87 by hand is imposed. The limit comprises a stepped block 114 coöperating with a yoke 115 carried in the cable connections 97. The yoke is provided with abutments 116 on its opposite arm adapted to engage the opposite steps on the block 114. The block 114 is connected to be moved small end first between the abutments 116 as the speed of the driving motor 79 is decreased by depressing the throttle lever 117, the throttle lever 117 connecting with the block 114 by means of cable 118 which cable leads to throttle 119.

A branch 120 from the cable 118 connects with the speed controlling device 77 through lever 121 adapted to move the driving belt 122 to change the speed, the arrangement being such that when the throttle lever 117 is depressed to lower the speed of the driving motor, the driving belt 122 is moved to high speed position, that is the opposite position from the one shown. The cable 120 also extends to the automatic mechanism, connecting levers 67 and 68 the ends of which are slidably pivoted to lever 64. Cable 120 passes over a pulley 127 at the fixed pivotal point of lever 64 then downwardly and over a pulley 128 at the lower end of the lever to connect with lever 68 at point 121, then passes upwardly to connect with lever 67 and over pulley 129 from whence the cable connects with spring 131 the end of which is fastened to arm 65. When the throttle lever 117 is depressed to lower the speed of the driving motor, the levers 67 and 68 are moved inwardly, thereby making necessary a greater movement of the piston rod 12 to effect a given movement of the power shifting devices 31, 25, etc. Thus the balancing devices 16 are moved to a greater extent on low speed than on high speed.

When the balancing devices are moved by the automatic mechanism, they are effectively locked in any position to which they are moved (provided the shoulder forks 82 are not moved) by means of the fluid confined in opposite ends of cylinder 10 by means of the valve 25 (see Fig. 6). When the automatic mechanism is not to be used, and is unclutched through clutch 80 from the driving motor 79, it is desirable that the lever 13 be locked in its central position and not in other positions. To this end a by-pass 132 is provided on the cylinder tank. This by-pass contains a valve 133 which is normally closed. This valve is connected with cable 134 which extends to clutch lever 135 from foot lever 136, the arrangement being such that when the lever 136 is depressed to release the clutch 80, the by-pass valve 133 is opened whereupon the piston 11 and the rod 13 are free to be moved by pressure on the balancing devices to their central position. A latch 137 in the form of stop 138 on piston rod 12 and a co-acting bell-crank lever 139 pivoted to a fixed point and provided with a notch 140 adapted to engage the stop 138, is held in a normally open position against the pressure of spring 141 by means of stop 142 on cable 134. Upon the opening of clutch 80, this latch is released, and engages and holds the piston rod 12 when the lever 13 reaches its central position. Springs 143 and 144 connected at their opposite ends to fixed points, are connected at their adjoining ends to lever 13, for the purpose of assisting in the return of lever 13 to its normal central position.

The operation of my invention is readily understood. Several of its phases are illustrated in Figs. 10, 11 and 12. In Fig. 10 is illustrated the positions of the parts immediately upon a list to the left. The main body of the mechanism is of course fixed to any suitable stationary part of the apparatus. Upon a list to the left, the angular position of the standard of position which is normally normal to the horizontal as shown by the line N—N and which coincides with the vertical V—V, is changed with respect to the vertical. The float 47 tends to remain in vertical postion, and therefore moves to the right to a position defined by the right-hand end of the slot 50 in the tank 44, the line defining the angular position now occupied by the float being designated P—P. This movement of the float to the right with respect to the tank 44 has carried with it the yoke 52, the rod 58, the lever 60, the lever 59 and the frame 31, raising the frame 31 upwardly. Immediately this takes place, the frame 31 in reciprocation carries with it to the left the block 30 and the valve 25, giving the valve 25 the position shown in Fig. 7. The by-pass port 22 being closed, the port 23 being open to fluid from the port 20, and the port 24 being open to the by-pass, fluid instantly passes into the left-hand end of the cylinder 10 and drives the piston 11 to the right thereby carrying lever 13 to the right and operating the balancing devices through connections 15, 92, 91, 89, 88 and 94 to cause a movement of them sufficient to correct the list to the left. The positions of the parts after this operation of the balancing devices are illustrated in Fig. 11. It will be seen that the movement of the piston rod 12 to the right has carried with it the lever 64, and that the lever 64 has moved the tank 44 to the right until the float 47 is free to occupy a vertical position, this movement of the tank having taken place about the pivot 57 and the frame 46, and the line P—P of the float rod and yoke now coincides with the vertical. This movement of the float to the vertical position, and a slight movement from right to left which ensues upon the end of the movement of the tank, throws the link 58 and lever 59 to the left thereby tending to lower the frame 31 to its central position. At one and the same time the link 67 has been moved to the left by movement of the lever 64 and this also lowers the frame 31, the net result of the conjoint movement of the lever 59 by the float 47 and the follow-up device 64—67 being the movement of the frame to its central position, whereupon the valve 25 is instantly moved to its central position, and movement of the balancing devices is halted, the parts having the positions shown in Figs. 11 and 6. Owing to the conjoint differential action of the float 47 and the follow-up device 64—67 on the relay frame 31 of the power shifting device, the action of the power shifting device is made especially rapid, positive and powerful. Upon the return of the craft toward its normal horizontal position, and promptly upon the commencement of the recovery of balance, it will be seen (Fig. 11) that the angular position of the craft is again changed with respect to the standard of position, and that the line of the float P—P will therefore shift to the left of the line defining the position of the tank. Therefore the relay frame 31 is moved downwardly, throwing the valve 25 to the right, whereupon fluid is admitted to the right-hand end of cylinder 10, and the parts are moved from the positions which they occupy in Fig. 11 back to the positions they occupy in Fig. 2, this movement carrying the balancing devices back to normal at the same time that the craft returns to its normal horizontal position. Preferably the rate of operation of the mechanism is made such that it is greater than the rate of unbalancing of the craft usually met with, the movement of the balancing devices thereby being made to keep pace with the movement of the craft and the extent of movement being of course proportional to the extent of unbalancing.

Now when the speed of the air-craft is changed it is desirable that the speed of operation of the automatic mechanism be maintained substantially normal or above normal, since the rate of unbalancing is not any less when the speed of the air-craft is diminished. It is further desirable that a proportionally greater movement be given the balancing devices for a given degree of unbalancing when the speed of the air-craft is low. By connection of the speed controlling throttle lever 117 with the speed controlling lever 121 (Fig. 1) the rate of operation of the mechanism may be maintained normal or above normal, the lever 121 moving the driving belt 122 toward high speed position as the engine 79 is throttled. Connection with the same speed controlling lever 117 moves the levers 67 and 68 inwardly as the speed of the craft is decreased, thereby making necessary a greater movement of the piston rod 12 and hence the balancing devices 16, before the float 47 is freed by movement of the tank 44 and before the rod 67 has moved far enough to effect a movement of the frame 31 sufficient to move the valve 25 to its central position. These devices for changing the rate of operation and the degree of operation may be used independently of each other or of their connection with the throttle 118 of the driving motor. This would be preferable in case driving motor 79 were some auxiliary motor instead of the driving motor of the air-craft.

At any time it is desired during the automatic operation, the balancing devices may be moved manually through the shoulder forks 82 if desired, or automatically through movement of the hand lever 112 to change the angular position of the standard of position through movement of the lever 107 which moves the pivot 57 of the supporting hanger frame 46. The lever 112 is normally locked in a central position, and there is no need normally for its use. The shoulder forks 82 may be locked in position by means of a latch hereinafter described.

By turning the hand wheel 86 right or left, the rear vertical rudder 87 is moved right or left to steer the craft around a turn. The craft is automatically banked the proper degree for turning, and automatically straightened out again after the turn by the automatic mechanism. Through the levers 102—103 and connections 105—106 the angular position of the standard of position is altered with respect to the air craft when the wheel 86 is turned. The direction of movement of the pivot 57 of the standard of position accompanying movement of the wheel 86 is made such as to cause movement of the balancing devices first in a direction to bank the air-craft, and then in a direction to maintain the angle of bank. Such a movement of the standard of position is outlined in Fig. 12. This figure shows the standard of position moved to cause a list to the right, the pivot 57 being moved to the right, that is in the direction toward which it is desired to list the craft. This throws the float 47 to the right with respect to the tank 44, and the balancing devices are therefore moved in the same direction that they were moved in the correction of a list to the left, as outlined in Fig. 11. Thus the craft is banked to the right, but as the banking movement continues the float 44 is soon freed as shown in Fig. 11 illustrating the left list, and thereupon the balancing devices are operated in the reverse direction to limit the angle of bank in identically the same manner as the devices are moved to correct unbalancing. When the machine is straightened out, the wheel 86 is turned in the reverse direction, thus moving the pivot 57 of the standard of position in the reverse direction back to normal, whereupon the aircraft is returned by the balancing devices to its normal horizontal position.

By means of the limit device 115—114, when the speed of the craft is low, the throttle lever 117 having been depressed, it is impossible to move the vertical rudder so as to make a short turn. This prevents upsetting of the machine due to the making of acute turns at low speed.

When the balancing devices have been moved in either direction to their position of maximum effectiveness, and the unbalancing of the air-craft continues, the vertical rudder is automatically moved through the gearing 99 to turn the air-craft toward the high side as is commonly done by hand in the control of air-craft.

In Fig. 9 is shown the arrangement which I propose to employ in practice. This is also shown diagrammatically in Fig. 1 in connection with that portion of my invention previously described. The pump which is used to supply fluid to the mechanism is normally used for simultaneously supplying fluid to the water jackets of the driving motor, the weight of an additional pump, containing tank, and separate body of fluid being thus saved. Referring to Figs. 1 and 9, it will be seen that the fluid passes to the pump from the radiator 145, taking the direction of the arrows, through the mechanism either by way of the by-pass or by way of the cylinder, as described, thence through conduit 146, through the cooling jackets of the driving motor, through conduit 147, and to the radiator. Thus the mechanism is on the delivery or pressure side of the pump while the radiator which is incapable of standing high pressure is on the suction side of the pump, where the pressure is comparatively low. Extending around the mechanism from the delivery chamber of the pump 18 is a valve controlled by-pass 149 to the conduit 146. By throttling this by-pass, the speed of operation of the piston within the cylinder of the mechanism may be controlled without affecting the locking action of the fluid normally confined in opposite ends of the cylinder upon the piston, the controlling piston valve normally maintaining the ports 23 and 24 closed.

In connection with the shoulder forks of the control (82, Fig. 1) is provided a lock 150 connected with the foot lever 136 for operating the clutch lever 135 of the mechanism, the connection being such that the shoulder forks 82 are normally locked in position when the automatic mechanism is set into operation, this locking taking place when the shoulder forks are given their normal central position. A manually operable lever 151 is provided in the connection 152, whereby the lock 150 may be released at will while the automatic mechanism is operating, whereby the manual control may be used in conjunction with the automatic control, despite the automatic locking effected through the connection 152.

While I have described the best form of my invention now known to me, I desire to have it understood that my invention may be given many forms by those skilled in the art without departing in any wise from its generic spirit. Therefore I desire to cover in the annexed claims all forms which my invention may be given, no matter what the nature of the equivalent devices making up the particular embodiment of my invention, and I reserve the right to use any of the well known equivalent devices which the art abounds in, in lieu of those particular devices described herein as making up this embodiment of my invention.

What I claim is:

1. In an air-craft, a motor for driving the same, means for changing the speed of the motor, an automatic balancing mechanism driven from the motor, balancing devices operated by the balancing mechanism, and speed changing means associated with the balancing mechanism and operatively connected with the means for changing the speed of the motor whereby the relative speed of operation of the motor and balancing mechanism is changed.

2. In an air craft, balancing devices, an automatic balancing mechanism for operating said devices, a driving motor, a movable part the position of which is changed when the speed of the craft is changed through change in speed of the driving motor, and speed changing means for the said balancing mechanism connected with said movable part to be operated thereby.

3. In an air-craft, a motor for driving the same, means for changing the speed of the motor, said means being normally in full speed position, an automatic balancing mechanism driven from the motor, balancing devices operated by the balancing mechanism, and speed changing means associated with the balancing mechanism and operatively connected with the means for changing the speed of the motor, said second named speed changing means being normally in low speed position, whereby the speed of the mechanism is maintained substantially constant when the speed of the motor is decreased.

4. In an air-craft, a driving motor, speed changing means for the same, an automatic balancing mechanism comprising a power transmitting device, an operating device, balancing devices connected with the operating device, a standard of position controlling the transmission of power to said operating device, a follow-up device defining the degree of movement of said operating device, means for varying the limiting action of said follow-up device, and connections between the speed changing device of the motor aforesaid and said limit varying means.

5. In an air-craft, a driving motor, speed changing means for the same, balancing devices, an automatic balancing mechanism connected with the balancing devices for moving the same, and means connected with the motor speed changing means simultaneously changing the degree of operation of said balancing devices for a given angle of list and whereby the balancing devices are moved a greater extent when the motor speed is decreased.

6. In an air craft, a driving motor, balancing devices, an automatic balancing mechanism connected to operate said devices, adjustable means for varying the amplitude of movement of the balancing devices by said mechanism, a movable part the position of which is changed when the speed of the craft is changed through change in speed of the driving motor, and connections between said movable part and said amplitude adjusting means whereby the amplitude of movement of said balancing devices is adjusted in accordance with the position of said movable part.

7. In an air craft, a driving motor, balancing devices, an automatic balancing mechanism connected to operate said balancing devices, adjustable means for varying the speed of operation of the balancing devices, a movable part the position of which is changed when the speed of the craft is changed through change in speed of the driving motor, and connections between said movable part and said speed adjusting means of the said balancing devices whereby the rate of movement thereof is determined in accordance with the position of said movable part.

8. In an air-craft, a driving motor, speed changing means for the same, a vertical rudder for turning the craft at will, and a limit device connected with the vertical rudder and operated by the motor change speed means.

9. In an air craft, a propelling motor, a steering means, means for operating the same, a movable part the position of which is changed when the speed of the craft is changed through change in speed of the propelling motor, and a limit device connected for operation by said movable part and defining the extent of movement of said steering means.

10. In an air craft, a driving motor, speed changing means for the same, steering means for turning the craft at will, an adjustable device arranged to determine the extent of movement of said steering means, together with connections between said adjusting device and the speed changing means of the motor whereby said device is adjusted when said speed changing means is operated.

11. An automatic balancing mechanism comprising an operating device for balancing devices, power transmitting means, a standard of position normally controlling the transmission of power to said operating device, a follow-up device defining the degree of movement of said operating device, said operating device being normally locked into whatever position it has been moved, means for unlocking at will said operating device, and a normally inoperative latching device operative upon the unlocking of said operating device for holding said operating device in its central position.

12. An automatic balancing mechanism comprising an operating device for balancing devices, power transmitting means, a standard of position normally controlling the transmission of power to said operating device, a follow-up device defining the degree of movement of said operating device, said operating device being normally locked into whatever position it has been moved, means for unlocking at will said operating device, and means insuring the return of said operating means to its central position.

13. An automatic balancing system comprising balancing devices, an automatic mechanism for operating the same comprising an operating device for the balancing devices, power transmitting means, a standard of position controlling the application of power to said operating means, a follow-up device defining the degree of movement of said operating means, said operating means being normally locked in the positions to which it is moved, means for unlocking said operating means, a driving motor for the mechanism, a clutch between the motor and the mechanism, and means for simultaneously opening the clutch and freeing said operating means, and a normally inoperative latching means for holding said operating means in its central position.

14. A balancing system comprising balancing devices, automatic means for operating the same, connections between the balancing devices and the operating means, said connections including gearing adapted to operate said balancing devices to a position of maximum effectiveness and thereafter to cease operating them, a vertical rudder, and connections between said automatic operating means for the balancing devices and said vertical rudder, said connections including gearing adapted to automatically operate said vertical rudder only after said balancing devices have been moved to a predetermined position.

15. A balancing system comprising balancing devices, automatic means for operating the same, connections between the balancing devices and the operating means, a vertical rudder, and connections between said automatic operating means for the balancing devices and the said vertical rudder including gearing adapted automatically to operate said vertical rudder only after said balancing devices have been moved to a predetermined position.

16. A balancing system comprising balancing devices, automatic means for operating the same, connections between the balancing devices and the operating means, a vertical rudder, hand control means for moving the same, a differential connection between the said hand control and said vertical rudder, and a connection from the operating means for the balancing devices to the said differential connection, whereby said vertical rudder is operated conjointly by said automatic operating means and said hand control.

17. An automatic balancing mechanism comprising operating means for balancing devices, power transmitting means, a power shifting device controlling the transmission of power to said operating means, a standard of position, and a three point differential element connected at one extremity to said operating means, at another to the standard of position and intermediately to the power shifting means.

18. An automatic balancing mechanism comprising operating means for balancing devices, power transmitting means, a power shifting device controlling the transmission of power to said operating means, a standard of position, and a differential lever connected at the middle to said power shifting device, and having its opposite ends connected to the standard of position and operating means respectively.

19. An automatic balancing mechanism comprising an operating means for balancing devices, power transmitting means, power shifting means through which the application of power to said operating means is controlled, a standard of position of the pendulum type having a normally fixed pivotal point, and a differential element connected with the power shifting device on the one hand and separately with the operating means and standard of position on the other hand.

20. An automatic balancing mechanism comprising an operating means for balancing devices, power transmitting means, power shifting means, a standard of position comprising a tank and float having a common normally fixed pivot, connection between the float and the power shifting device, a follow-up device, and a connection between the operating device and the tank whereby the tank is caused to follow the movements of the float about their pivot.

21. An automatic balancing mechanism comprising an operating means for balancing devices, power transmitting means, power shifting means, a standard of position comprising a tank and float having a common normally fixed pivot, a differential connection between the power shifting device on the one hand and the float and the operating device on the other, and a connection from the operating device to the tank whereby the tank is caused to follow the movements of the float about their pivot.

22. An automatic balancing mechanism comprising an operating means for balancing devices, power transmitting means, power shifting means, a standard of position comprising a tank and float having a common normally fixed pivot, connection between the float and the power shifting device, a follow-up device, a connection between the operating device and the tank whereby the tank is caused to follow the movements of the float about their pivot, and means for shifting the normally fixed pivot of the float and tank at will.

23. An automatic balancing mechanism comprising an operating means for balancing devices, power transmitting means, a power shifting device, a standard of position comprising a tank and float, a pivoted frame to which the tank and float are pivoted, a connection between the tank and the operating device, and means for moving said frame about its pivot to change the position of the pivot of the float.

24. An automatic balancing mechanism comprising an operating means for balancing devices, power transmitting means, a power shifting device, a standard of position comprising a tank and float, a pivoted frame to which the tank and float are pivoted, a connection between the tank and the operating device, and means for moving said frame about its pivot to change the position of the pivot of the float, and the points of connection of said float and power shifting device, tank and operating means and the pivotal point of the frame normally lying in a common line of centers.

25. An automatic balancing mechanism comprising an operating means for balancing devices, power transmitting means, a power shifting device a gravity controlled standard of position, a pivoted frame supporting said standard, means for moving said frame about its pivot to change the normal angular position of said standard with respect to the craft, a follow-up device intermediate the operating means and the power shifting means, and an operating connection between said power shifting means and said standard, the point of said latter connection to said standard, and the pivotal points of the said frame supporting the standard normally lying on a common line of centers.

26. An automatic balancing mechanism comprising an operating means for balancing devices, power transmitting means, a power shifting device, a standard of position comprising a tank and float, a normally fixed but movable frame on which the tank and float are pivoted, connections between the float and the power shifting device and between the tank and the operating means, a follow-up device, and means for moving said frame to change the position of the pivot.

27. An automatic balancing mechanism comprising an operating means for balancing devices, power transmitting means, a power shifting device, a standard of position, comprising a tank and float, a pivoted frame to which the tank and float are pivoted, a connection between the tank and the operating device, a differential element connected with said frame for moving the same, a vertical rudder control, a hand lever, and connections from said differential element to said rear rudder control and hand lever respectively.

28. A hydraulic balancing system for air craft comprising a hydraulic circulating pump, a water cooled driving motor supplied with fluid by said pump, and a hydraulic balancing mechanism supplied with operating fluid from said pump in series with said driving motor.

29. A hydraulic balancing system comprising a water cooled driving motor, a circulating pump and radiator therefor, a hydraulic balancing mechanism supplied with fluid intermittently from said pump, said balancing mechanism comprising a by-pass to the motor of the mechanism through which by-pass fluid normally passes to the said driving motor from the circulating pump, and a valve which shunts fluid from the by-pass to the motor of the mechanism at times.

30. A hydraulic balancing system for air craft comprising a circulating pump, a water cooled driving motor, and a radiator connected in a circuit in the order named, and a hydraulic balancing mechanism also connected with said circuit on the discharge side of the pump and in advance of the radiator.

31. In an air craft, a hydraulic balancing system comprising a driving motor for the craft, having a water cooled jacket, a circulating pump supplying water to said jacket, a hydraulic balancing mechanism for the craft receiving power from said pump in series with said water jacket of the motor, balancing devices operated by said mechanism, and a normally closed by-pass of the full capacity of the said circulating pump extending completely around said balancing mechanism, whereby upon derangement of said balancing mechanism, the cooling water from the pump may be shunted completely there around and the operation of said driving motor continued without detriment.

32. In a balancing system for air craft, an automatic control means, a manual control means, means for cutting the automatic control means into and out of operation at will, and a latch connected with the last named means and adapted to lock the manual control upon the operation of the automatic control means.

33. In a balancing system for air craft, an automatic control means, a manual control means, means for cutting the automatic control means into and out of operation at will, a latch connected with the last named means and adapted to lock the manual control upon the operation of the automatic control means, and means for releasing said latch at will independently of the state of operation of said automatic control means.

In testimony whereof I affix my signature in presence of two witnesses.

JOHN P. TARBOX.

Witnesses:
CHARLES LOWELL HOWARD,
C. B. BULL.